M. A. RICHARDSON.
Cream Pump.
No. 1,433. Reissued March 17, 1863.
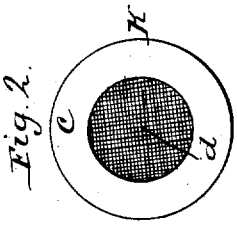
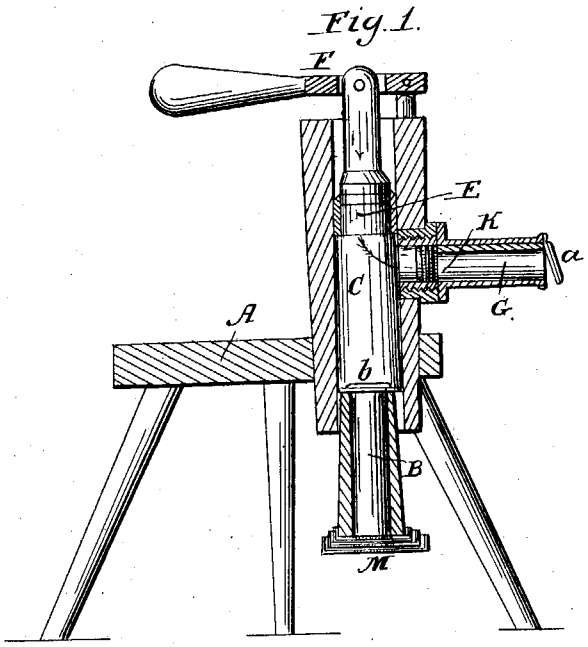
Witnesses:
Chas. H. Spencer
R. F. Osgood
Inventor.
Wm A. Richardson
by J. Fraser Hoo Atty
N. PETERS, Photo-Lithographer, Washington, D. C.

UNITED STATES PATENT OFFICE.

M. A. RICHARDSON, OF SHERMAN, NEW YORK.

IMPROVEMENT IN CREAM-PUMPS.

Specification forming part of Letters Patent No. 36,530, dated September 23, 1862; Reissue No. 1,433, dated March 17, 1863.

*To all whom it may concern:*

Be it known that I, M. A. RICHARDSON, of Sherman, in the county of Chautauqua and State of New York, have invented a new and useful Improvement in Cream-Pumps, for which Letters Patent of the United States were granted me on the 23d day of September, 1862; and I do hereby declare that the following is a full and exact description thereof, reference being had to the accompanying drawings, making part of this specification.

Figure 1 is a central vertical section of my improved cream-pump; Fig. 2, one of the screws detached.

Like letters of reference indicate corresponding parts in both figures.

In the gathering of cream on the top of milk, its surface, particularly in warm weather, becomes glazed and hardened by the evaporation of the watery matter, leaving a thin covering or coating that is very tenacious. In churning, these hardened portions of the cream do not become broken sufficiently to form butter, but remain in clots or flakes that mix partially with the butter when it is gathered, and remain partially in the buttermilk or whey and are lost. This produces an inferior article of butter, not only on account of its mottled appearance, but on account of its impurity, as the flavor becomes affected, and in a short time the butter is rendered rancid.

It is the especial object of my improvement to remedy this difficulty by thoroughly breaking up or disintegrating these hardened portions of cream, but in such a gentle manner that the spherical formation of the globules shall remain uninjured, as it is well known that good butter is best produced by a long-continued and gentle action, rather than by an intense and quick friction.

To this end, my invention consists in gently and slowly forcing the cream, preparatory to churning, through the outlet or spout of a force-pump that has a fine-wire or perforated screen or screens therein, so that the cream shall be thoroughly broken and separated. I propose to force the cream through the spout but once, and that very slowly, to avoid as much as possible the excessive friction and the breaking of the globules, as the best action on the mass to produce butter is the friction of the globules against each other under the dasher of the churn. If this is done by any grinding or excessive motion, the butter is produced too quickly and its grain is injured.

As represented in the drawings, a bench, A, is provided, having suitably secured thereto a pump-barrel, C, in which plays a solid piston, E, connecting with an operating-lever, F, in the usual manner. Beneath the piston is an ordinary spout, G, having a valve, *a*, secured to its extremity, opening outward, and at the bottom of the vacuum-chamber is also situated a valve, *b*, covering the induction-tube B, and opening upward. On operating the piston the cream is drawn upward from the receptacle in which it rests through the tube B into the vacuum-chamber by the upward stroke of the piston, and forced outward through the spout by its downward stroke, as is apparent from the drawings.

It is obvious that a different form of force-pump may be used from that above described to produce the same effect—namely, the passage of the cream through it—and its forcible expulsion through the eduction-outlet.

I do not confine myself to the general parts shown, with exactness, but may apply my particular improvement to any pump to which it is adapted.

Within the spout G, and covering its entire diameter, is situated one or more screens, K, formed preferably of a ring, *c*, of metal, Fig. 2, and a central covering of very fine wire meshes, *d*, or equivalent, over an opening, of suitable size. I prefer to secure the screen or screens in the rear or inner end of the spout, resting against a shoulder therein, and with a rubber ring behind to hold them in place, but they can be secured in the outer end of the spout, if desirable, or intermediately, with the same effect, as the object to be accomplished is to allow none of the cream to escape from the pump without passing through the screen or screens.

In passing through the fine meshes or perforations of the screen, it is obvious that the tough and hard portions of the cream must become perfectly broken and disintegrated, as they cannot escape otherwise from the pump. In this condition, when churned, the globules are as readily broken by the action as those of the other portions of the cream.

I am aware that milk or thin cream has been subjected to action by passing through a pipe and being projected or dashed against and through wire-gauze partitions placed without and distinct from the discharge-outlet. However effective such an arrangement may be for breaking the globules of milk or thin cream, it is at once manifest that it would never answer for the result I seek to accomplish, as the hardened portions of cream, from their tenacity, could not be made to pass through the partitions by percussion alone by any ordinary power that might be applied to the piston of the pump, but would strike and fall and remain unbroken. By my arrangement the action is concentrated within the spout or discharge-outlet, through whose screen the cream mus pass to escape, and the pressure is so positive and direct that this result must be produced with but comparatively small outlay of power.

If desired, additional screens M may be used at the bottom of the pump; but in practice I do not find such necessary under ordinary circumstances.

I do not claim forcing milk or cream by percussion through wire-gauze partitions situated outside of and distinct from the discharge-outlet of a force-pump, as I am aware that such an effect has before been accomplished; but

What I claim as my invention, and desire to secure by Letters Patent, is—

The use of a screen or screens, K, within or closing the discharge-outlet of a force-pump, for the purpose of breaking the tenacious and hardened portions of cream, arranged and operating substantially as herein set forth.

In witness whereof I have hereunto set my hand, in the presence of two subscribing witnesses, this 28th day of November, 1862.

M. A. RICHARDSON.

Witnesses:
J. FRASER,
R. F. OSGOOD.